UNITED STATES PATENT OFFICE.

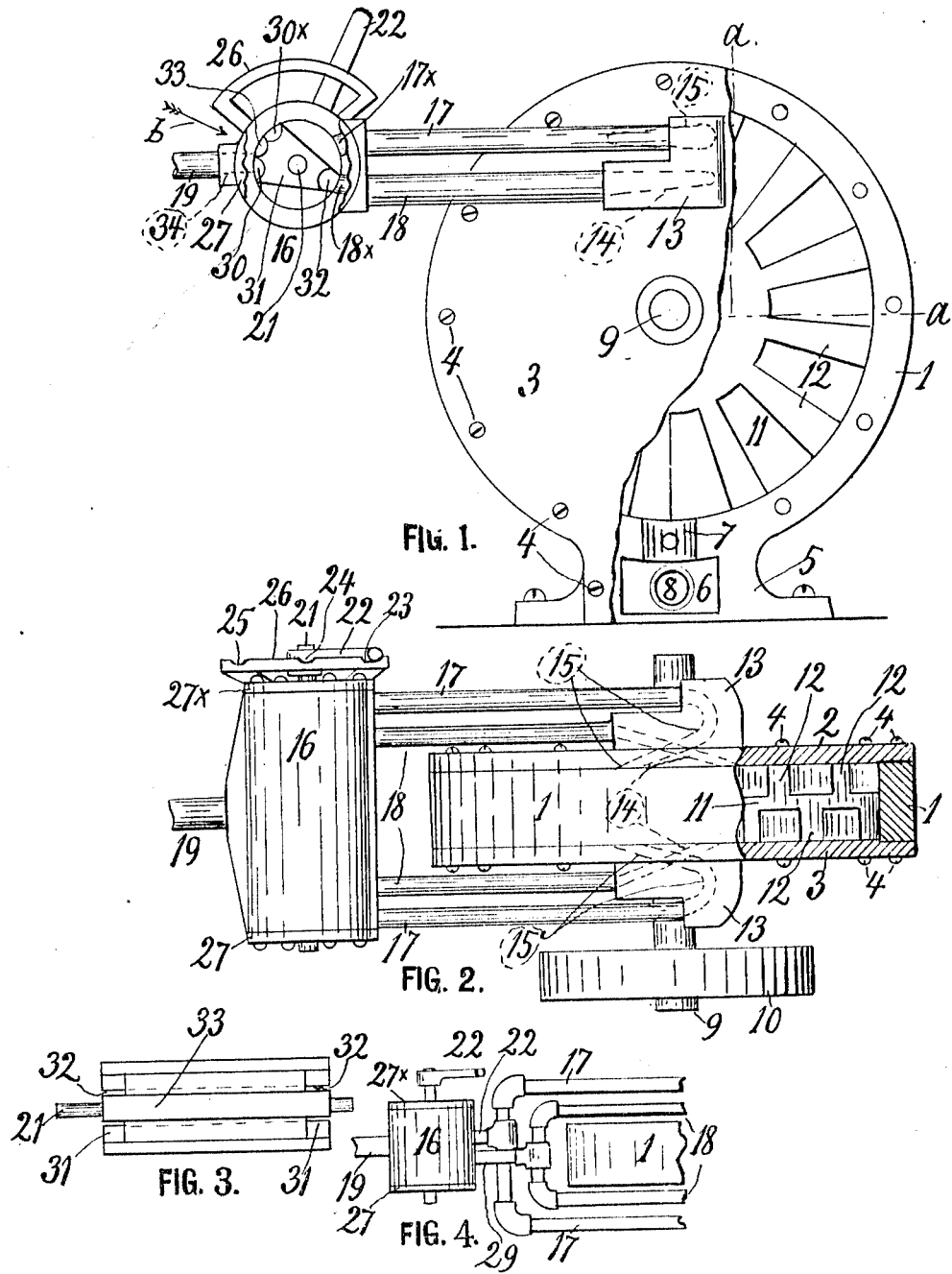

FERDINAND F. RATHKE, OF CLAYTON, WISCONSIN.

TURBINE.

1,001,551.

Specification of Letters Patent.   Patented Aug. 22, 1911.

Application filed May 18, 1911. Serial No. 627,937.

*To all whom it may concern:*

Be it known that I, FERDINAND F. RATHKE, a citizen of the United States, residing at Clayton, in the county of Barron and State of Wisconsin, have invented a new and useful Turbine, of which the following is a specification.

My invention relates to turbines adapted to be driven by jets of steam, water or similar agents; and the object is to provide a cheap, simple, durable and easily reversible turbine.

In the accompanying drawing,—Figure 1 is a side elevation of my improved turbine with about one-half of the cylinder cover 3 and most of the end cover 27 of the valve shell broken away. Fig. 2 is a top view of the turbine and valve shown in Fig. 1 with a fly-wheel added and the cylinder in section on the line $a$—$a$ in Fig. 1. Fig. 3 is a detail view of the valve plug shown in Fig. 1 looking in the direction of the arrow $b$. Fig. 4 is a modification of a portion of Fig. 2 on a reduced scale.

Referring to the drawing by reference numerals, 1 designates a cylinder, whose ends are closed by covers 2 and 3, secured by screws 4. The base of the cylinder forms a support 5, in which there is a cavity 6, adapted to receive the exhaust steam from the cylinder and direct it out through an exhaust pipe 8.

Journaled centrally in the covers is a shaft 9, which may have a combined fly-wheel and pulley 10 for the usual purposes of such wheels. Secured on the shaft within the cylinder and fitting in it and between its covers is a disk 11, which is formed with a solid hub and with radial ribs or wings 12, which stand at right angles to the sides of the disk proper and are arranged in alternate or zig-zag order upon said two sides; the angular position of the wings is to enable a jet of steam or like means to rotate the disk in either direction according to the direction of the jet; and the steam is applied to both sides of the disk so as to equalize the pressure on the disk and thus avoid undue wear of the parts.

Each cylinder cover is provided with an external abutment 13, through which and through the cover are formed two slanting steam ducts 14 and 15, each of which slants in opposite direction to the other, so as to cause alternately reverse rotation of the disk. A valve shell 16 is connected by two pipes 17 with the ducts 15 and by two pipes 18 with the ducts 14. The valve shell is provided with ports 17ˣ leading to the pipes 17, and ports 18ˣ leading to the pipes 18. The shell also has a supply or inlet pipe 19. In the shell is fitted a rotary valve-plug 20, which may be turned by a stem 21 and lever 22 fixed thereon.

To hold the lever 22 in any desired position, it is so arranged that it springs into either one of the notches 23, 24 and 25 of a segment 26, which may be secured to either end of the shell, or the cover 27 or 27ˣ thereof.

In the modified form shown in Fig. 4, the valve plug and shell may be much shorter than in Figs. 2 and 3, because the pipes 17 are united in a nipple 28, and the pipes 18 are united in a nipple 29, and said two nipples may be brought quite close together, while in Figs. 1 and 3 it will be seen that the valve plug must have two long grooves, 30 and 30ˣ, and end-grooves 31, which connect said two grooves with a single longitudinal groove 32, by which the steam is distributed to the pipes leading to the turbine.

In the operation of the turbine, when the lever 22 is in the notch 24, the marginal face 33 of the valve plug closes the inlet port 34 from pipe 19, and the turbine stands still; but if the lever be placed at notch 23, the steam will pass through the grooves 30, 31, 32 and the pipes 18 and through the jet-forming ducts 14 rotate the disk in one direction; and if the handle or lever 22 be placed in notch 25, the steam will pass through grooves 30, 31, 32 and pipes 17 and the curved jet-producing ducts 15, and rotate the disk in the other or reverse direction; and by arranging the lever at some point between the notch 24 and either one of the notches 23 and 25, the portion 33 of the valve-plug will more or less cover the inlet port 34 and thereby vary the speed of the turbine.

What I claim is:

1. In a turbine, the combination with a closed cylinder, of a disk rotatably fitted therein and having a solid central portion and therebeyond at each side of the disk radial wings at both sides of the disk, said wings standing at substantially right angles to the side of the disk, and means for applying simultaneously two jets of steam or similar pressure-producing agent, one jet at each side of the disk in a slanting direction to the side of the disk, so as to rotate it in a certain direction, and means for closing the flow of steam to said jets, and means for producing two other jets slanting in reverse directions of the first mentioned jets, so as to thereby reverse the rotation of the disk, said cylinder having an exhaust opening for the used steam.

2. In a turbine, the combination with a closed cylinder, of a shaft journaled centrally in the covers of the cylinder, a disk secured on the shaft within the cylinder and having upon its sides radial wings arranged in zigzag or alternate order at the two sides, said cylinder having an exhaust opening, and in each of its covers two oppositely inclined jet-producing ducts for steam or similar agent to drive the disk, a valve and a hand-lever controlling the same, and pipes leading from the valve to the two ducts arranged for rotation of the disk in one direction, and other pipes connecting the valve with the ducts arranged for rotation of the disk in the opposite direction; said valve being of the kind that is capable of directing steam or fluid alternately into two differently located ports, and to close off all passage of the steam when so desired.

In testimony whereof I affix my signature, in presence of two witnesses.

FERDINAND F. RATHKE.

Witnesses:
HENRY KRUEGER,
HENRY JOHNSON.